United States Patent
Foo

(10) Patent No.: US 9,304,812 B2
(45) Date of Patent: Apr. 5, 2016

(54) MULTI-PHASED AND MULTI-THREADED PROGRAM EXECUTION BASED ON SIMD RATIO

(75) Inventor: Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 712 days.

(21) Appl. No.: 13/068,791

(22) Filed: May 19, 2011

(65) Prior Publication Data

US 2012/0159120 A1   Jun. 21, 2012

(30) Foreign Application Priority Data

Dec. 16, 2010   (GB) .................................. 1021414.6

(51) Int. Cl.
| | | |
|---|---|---|
| G06F 9/46 | (2006.01) | |
| G06F 9/52 | (2006.01) | |
| G06F 9/48 | (2006.01) | |
| G06F 15/80 | (2006.01) | |
| G06F 9/30 | (2006.01) | |
| G06F 9/38 | (2006.01) | |
| G06T 1/20 | (2006.01) | |

(52) U.S. Cl.
CPC ............ *G06F 9/4881* (2013.01); *G06F 9/3009* (2013.01); *G06F 9/3851* (2013.01); *G06F 9/3887* (2013.01); *G06F 9/46* (2013.01); *G06F 9/522* (2013.01); *G06F 15/8007* (2013.01); *G06T 1/20* (2013.01); *Y02B 60/144* (2013.01)

(58) Field of Classification Search
CPC ....... G06F 9/3887; G06F 9/46; G06F 9/4881; G06F 9/522; G06F 15/8007; G06T 1/20
See application file for complete search history.

(56) References Cited

U.S. PATENT DOCUMENTS

| | | | |
|---|---|---|---|
| 5,968,167 | A | 10/1999 | Whittaker et al. |
| 6,105,127 | A | 8/2000 | Kimura et al. |
| 6,151,668 | A | 11/2000 | Pechanek et al. |
| 6,732,253 | B1 | 5/2004 | Redford |

(Continued)

FOREIGN PATENT DOCUMENTS

| | | |
|---|---|---|
| DE | 102008020782 A1 | 11/2009 |
| WO | WO 2006/083291 | 8/2006 |
| WO | WO 2010001736 A1 * | 1/2010 |

OTHER PUBLICATIONS

UK Patent Office Search Report dated Apr. 4, 2011 (1 page).

(Continued)

*Primary Examiner* — David J Huisman

(74) *Attorney, Agent, or Firm* — Vorys, Sater, Seymour and Pease LLP; Vincent M DeLuca

(57) ABSTRACT

A microprocessor is configured to execute programs divided into discrete phases. A scheduler is provided for scheduling instructions. A plurality of resources are for executing instructions issued by the scheduler, wherein the scheduler is configured to schedule each phase of the program only after receiving an indication that execution of the preceding phase of the program has been completed. By splitting programs into multiple phases and providing a scheduler that is able to determine whether execution of a phase has been completed, each phase can be separately scheduled and the results of preceding phases can be used to inform the scheduling of subsequent phases. In one example, different numbers of threads and/or different numbers of data instances per thread may be processed for different phases of the same program.

17 Claims, 5 Drawing Sheets

(56) References Cited

U.S. PATENT DOCUMENTS

| | | | |
|---|---|---|---|
| 6,897,871 | B1 | 5/2005 | Morein et al. |
| 7,010,787 | B2 * | 3/2006 | Sakai .................... 717/159 |
| 7,058,945 | B2 * | 6/2006 | Ichinose et al. ......... 718/102 |
| 7,327,369 | B2 | 2/2008 | Morein et al. |
| 7,366,878 | B1 * | 4/2008 | Mills et al. ............. 712/214 |
| 7,518,993 | B1 | 4/2009 | Dennis |
| 7,542,043 | B1 | 6/2009 | Lindholm et al. |
| 7,742,053 | B2 | 6/2010 | Lefebvre et al. |
| 7,836,116 | B1 | 11/2010 | Goodnight et al. |
| 7,999,808 | B1 | 8/2011 | Aila et al. |
| 8,018,457 | B2 | 9/2011 | Peterson et al. |
| 8,065,288 | B1 | 11/2011 | Garland et al. |
| 8,174,531 | B1 | 5/2012 | Lindholm et al. |
| 8,405,665 | B2 | 3/2013 | Lindholm et al. |
| 8,499,305 | B2 * | 7/2013 | Jiao ....................... 718/107 |
| 8,615,762 | B2 * | 12/2013 | Nishihata ............... 718/100 |
| 2004/0107421 | A1 | 6/2004 | VoBa et al. |
| 2005/0097552 | A1 | 5/2005 | O'Connor et al. |
| 2008/0072015 | A1 | 3/2008 | Julier et al. |
| 2008/0098208 | A1 | 4/2008 | Reid et al. |
| 2008/0313435 | A1 | 12/2008 | Orion et al. |
| 2009/0284523 | A1 | 11/2009 | Peterson et al. |
| 2009/0322752 | A1 | 12/2009 | Peterson et al. |
| 2010/0064291 | A1 | 3/2010 | Aila et al. |
| 2010/0077010 | A1 | 3/2010 | Aila et al. |

OTHER PUBLICATIONS

Lindholm, E. et al. "NVIDIA Tesla: A Unified Graphics and Computing Architecture", IEEE Micro, IEEE Service Center ISSN 0272-1732 (2008), vol. 27, No. 2, pp. 39-55.

Sugerman, "GRAMPS: A Programming Model for Graphics Pipelines", ACM Transactions on Graphics, vol. 28, No. 1, Article 4, Publication date: Jan. 2009, pp. 1-11.

* cited by examiner

MULTI-PHASED AND MULTI-THREADED PROGRAM EXECUTION BASED ON SIMD RATIO

FIELD OF THE INVENTION

The present invention relates to the field of microprocessors and is particularly advantageous for single instruction multiple data (SIMD) processors.

BACKGROUND TO THE INVENTION

With some types of data, such as graphics data, large blocks of data often need to undergo the same processing operations. One example is when changing the brightness of an image. SIMD processing is advantageous for this process. A SIMD processor is a microprocessor with execution units, caches and memories as with any other processor, but additionally incorporates the concept of parallel execution of multiple data streams. Instead of individually fetching data instances, a single fetch instruction can be used to fetch a block of data. A single instruction can then be used to operate on the fetched data block, such as an "add" operation. SIMD processing therefore reduces the load on the processor as compared with traditional single instruction single data (SISD) processing.

However, SIMD processing can only be used in limited circumstances. For example, even in situations where large blocks of data are initially to be processed in the same way, programs often contain conditional instructions or branch instructions that result in some data in a block being operated on by one branch of instructions and the remaining data by another branch of instructions. It is very often not possible to predict in advance how many data instances will need to be processed by one branch and how many by another.

Typically in a SIMD processor, a scheduler is used to schedule the execution of a program, allocating the resources required by the program at the outset. One solution for programs in which different parts of a data set are processed by different instructions during a portion of the program has been to execute each branch on all of the data and then discard the unwanted results. Clearly this is an inefficient use of processor resources and time.

Accordingly, it would be desirable to be able to better allocate resources during execution of programs in a SIMD processor, both to reduce power consumption and to optimise resource usage.

SUMMARY OF THE INVENTION

In a first aspect, the invention provides a microprocessor configured to execute programs divided into discrete phases, comprising:

a scheduler for scheduling program instructions to be executed on the processor; and a plurality of resources for executing programming instructions issued by the scheduler;

wherein the scheduler is configured to schedule each phase of the program only after receiving an indication that execution of the preceding phase of the program has been completed.

Preferably, the processor is a multithreaded processor. Preferably, the processor is a SIMD processor. Preferably, the scheduler is configured to recalculate a SIMD ratio for each phase of the program. The SIMD ratio is the number of data instances processed by a single instruction.

The processor includes a feedback loop to the scheduler through which the completion of each phase of the program is communicated to the scheduler. Preferably the scheduler maintains a record for each phase of the program that is scheduled, during execution of the phase of the program.

Preferably, the processor further includes a thread finished counter, wherein when each thread finishes a phase of the program an indication is sent to the thread finisher counter, and the processor is configured such that the scheduler schedules a next phase of the program only when the thread finished counter indicates that all threads for a preceding phase of the program have finished. The thread finished counter may be part of the scheduler or provided as a separate component. The thread finisher counter may comprise a memory storing a number of threads for each phase of a program and the thread finished counter decremented each time a thread finishes a phase, and configured such that when the thread finished counter reaches zero, the scheduler is instructed to schedule the next phase of the program.

The thread finished counter may store a record of a number of data instances for each thread of a phase of a program.

Preferably, the scheduler is configured to dynamically allocate the number of threads for each phase of the program based on the results of a preceding phase.

In a second aspect, the invention provides a method for scheduling programs in a microprocessor, the microprocessor comprising a scheduler for scheduling programs of programming instructions, the programs being divided into discrete phases, the method comprising the steps of:

Scheduling a first phase of a program to be executed on the processor;

executing the first phase of the program scheduled by the scheduler;

when execution of the first phase of the program is complete, providing an indication to the scheduler that execution of the first phase of the program is complete;

scheduling a second phase of the program after the scheduler has received the indication that execution of the first phase of the program is complete.

Preferably, the method further comprises maintaining a record for each phase of the program that is scheduled, during execution of that phase of the program.

Preferably, the method further comprises updating the record when each thread finishes a phase of the program, and scheduling a next phase of the program only when the record indicates that all threads for a preceding phase of the program have finished.

Preferably, the method further comprises storing a record of a number of data instances for each thread of a phase of a program.

Preferably, the method further comprises dynamically allocating the number of threads for each phase of the program based on the results of a preceding phase.

In the third aspect, the invention provides a computer program product, comprising computer executable code in the form a program executable on a SIMD processor, wherein the program is divided into a plurality of phases by phase instructions, the phase instructions being provided at points in the program where branches may occur and allowing a scheduler to schedule each phase of the program separately. At these points the SIMD ratio may need to change. An example of a point at which the SIMD ratio may need to change is following a branch instruction or conditional instruction. Another example is a sub-routine for alpha blending or anti-aliasing in a graphics processing program.

BRIEF DESCRIPTION OF THE DRAWINGS

Embodiments of the invention will now be described in detail, by way of example only, with reference to the accompanying drawings, in which.

DETAILED DESCRIPTION

Figure 1:
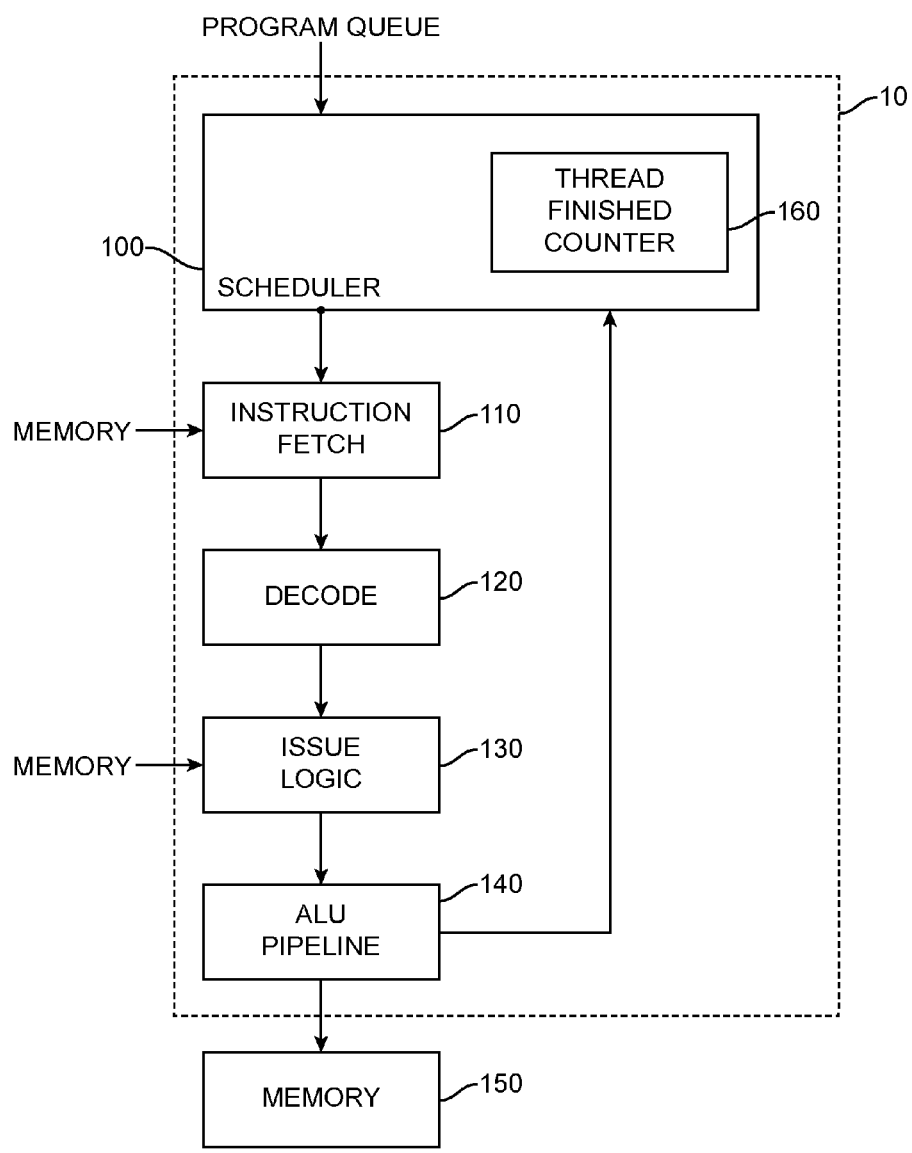
FIG. 1 is a schematic illustration of a processor in accordance with the present invention.
Figure 5:
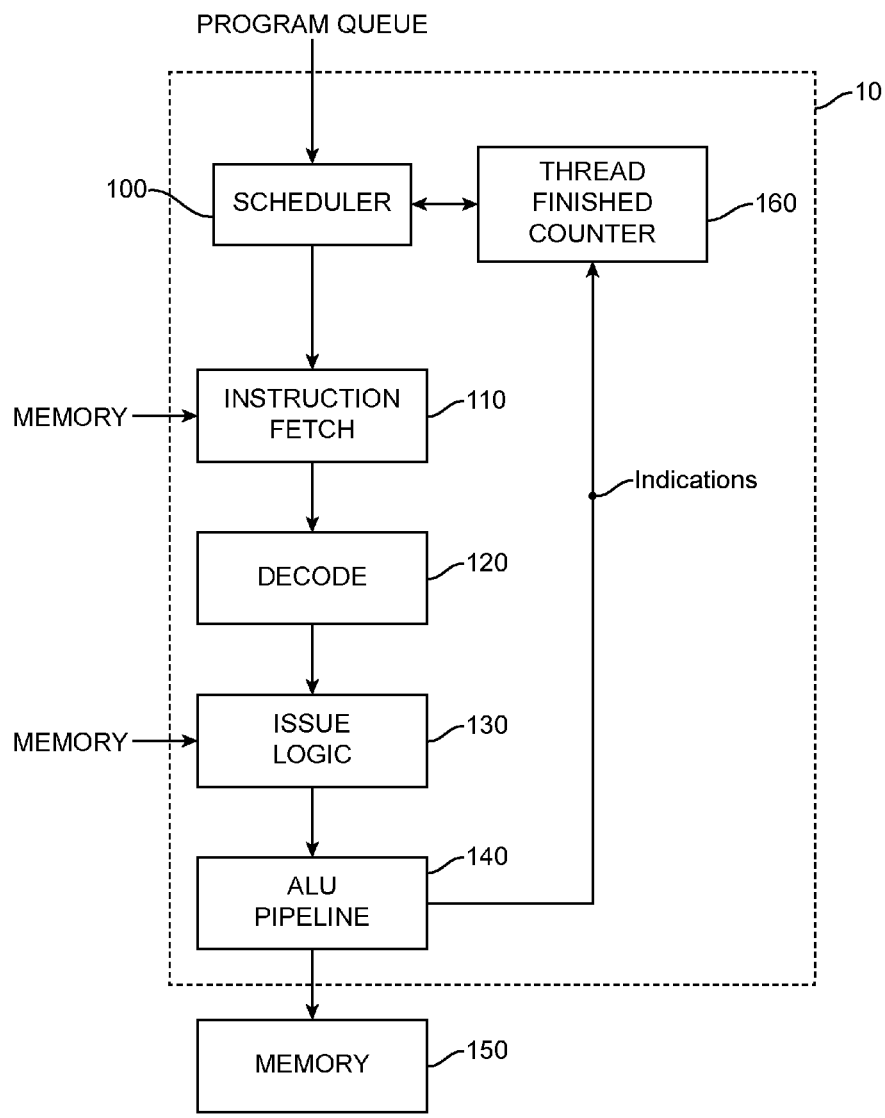
FIG. 5 is a schematic illustration of a processor in accordance with the present invention.

FIG. 1 is a schematic illustration of a multi-threaded SIMD processor 10 in accordance with an embodiment of the present invention. FIG. 5 is a schematic illustration of a multi-threaded SIMD processor 10 in accordance with another embodiment of the present invention; where the disclosures identify FIG. 1, such disclosures apply equally to FIG. 5, except that a thread finished counter is either in the scheduler 100 (FIG. 1) or provided as a separate component (FIG. 5). The processor is configured to schedule an execute individual phases of each program separate from one another, rather than scheduling a complete program all at once and then executing it.

As with conventional processors, following scheduling by the scheduler 100, instructions are fetched from memory by the instruction fetch units 110. Fetched instructions are decoded by the instruction decode unit 120 and fed to the issue logic 130. The issue logic feeds the instructions and fetched data to the arithmetic logic units (ALUs) 140 and the results are stored in registers or memory 150.

The ALUs 140 are also configured to feed back thread finished instructions to the scheduler 100. As will be explained, the thread finished instructions are provided at the end of each phase of program.

New programs are provided to the scheduler 100 divided into multiple phases. The way in which the programs are divided is determined by the programmer but typically a new phase will begin at a point in the program when the resource requirements of the program may change.

For example, a program may include a conditional instruction such that if a data value is less than a threshold it is processed by one branch of instructions otherwise it is processed by another branch of instructions. It may not be possible to determine, before execution, whether all data instances being processed by the program will be processed by a single branch or whether the data will be split between the two branches and if so, how many data instances will go down which branch. So at the point of the conditional instruction the number of threads required and the number of instruction fetches required may change in a way that cannot be reliably predicted before execution. By splitting a program at such points, resource scheduling can be managed dynamically in response to the data results.

Another example of an advantageous point for a new program phase is a routine for blending background colour with a transparent foreground object in the graphics program. A foreground object may have a uniform colour and so the data instances for the entire object can be processed in the same way for a colour calculation. However, the background over which the object sits may have variable colour and so different portions of the object must be processed differently in a blending routine. The blending routine may therefore be advantageously placed in a separate phase of the program to the colour routine.

A further example of an advantageous point for a new program phase is an anti-aliasing routine. Anti-aliasing is used when representing a high resolution image on a lower resolution screen. To remove undesirable atrefacts, such as jagged edges, an anti-aliasing routine is used to smooth out the image. But anti-aliasing is only required at the edges of graphics objects. If a block of uniform colour is in the image, it is not necessary to process the bulk of it at high resolution and perform anti-aliasing. Only at the boundaries with other objects is it necessary. So a program might include a branch instruction so that edge portions of image data are processed using the anti-aliasing routine while larger blocks of data are processed in a much less computationally expensive way.

The programs are divided into phases by the inclusion of "phase completed" instructions at the end of each phase of the program. The phase completed instructions when executed feed back to the scheduler 100 an indication that a phase has been completed. The phase completed instructions include a program identifier.

The program instructions also include an indication of the resource requirements of the program, but instead of being provided at the start of the program to cover the entire program, they are provided at the beginning of each phase of the program. The scheduler 100 can then assess if there are sufficient resources available to execute the phase. Because the resources required may depend on the outcome of a preceding phase, the indication of the resources required may be in the form an algorithm to calculate the resources required. This dynamic calculation of resource requirements removes the need to always provision for the worst case scenario and leads to more efficient resources allocation.

The scheduler 100 includes a multi-phased execution control unit or thread finished counter 160 that stores a record of each program scheduled, and the number of threads scheduled for the current phase. At the start of a new program the scheduler creates a new record in the 20 thread finished counter 160, and updates it every time a new phase of that program is scheduled. As each thread finishes a phase of a program the thread finished counter 160 receives an indication and adjusts the record for the number of threads executing for that phase of that program. The count of threads for a phase of that program is simply decremented each time a thread finishes the phase until the thread count reaches zero. When the thread count for the phase of that program reaches zero, a new phase of that program can be scheduled. The thread finished counter 160 may be provided as part of the scheduler or as a separate component; FIG. 1 depicts thread finished counter 160 as part of scheduler 100 and FIG. 5 depicts thread finished counter 160 as a separate component.

Figure 2:
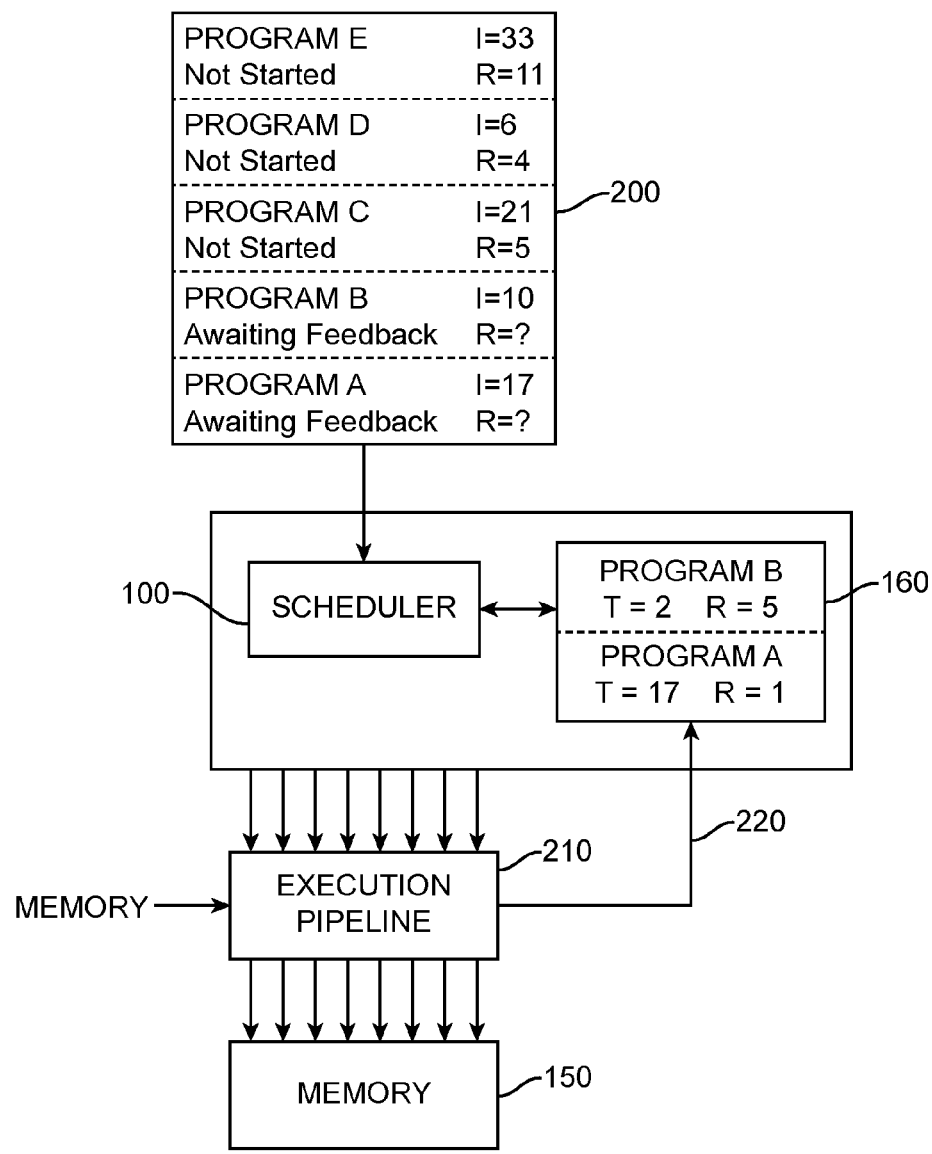
FIG. 2 is a schematic illustration of a program scheduling scheme in accordance with the present invention.

FIG. 2 is a schematic illustration of scheduling and execution process in accordance with the present invention showing the content of a program queue and a thread finished counter. A stream of programs is provided in a program queue as an input to a scheduler. The programs 200 are each divided into phases as described above, and each program has a predetermined number of data instances, indicated as the value I in the program queue. The number of instances per thread is indicated by the value R. The scheduler 100 schedules an individual phase of a program and waits for an indication that that phase is complete before scheduling the next phase of that program. In the example shown in FIG. 2 there are three programs in the program queue not yet scheduled and two programs, program A and program B, currently being executed, but with further phases remaining to be scheduled. The number of instances per thread, R, is known for the initial phase of each program but may be altered for subsequent phases of the program depending on the outcome of the preceding phases. So, the value of R is not known for the phases of programs A and B yet to be scheduled.

The phase of program A being executed has 17 threads, indicated in the thread finished counter 160 by the value T. Each thread contains a single data instance, so R=1. The phase of program B being executed has 2 threads each with 5 instances per thread. FIG. 2 shows multiple threads scheduled by the scheduler entering the execution pipeline 210. The execution pipeline comprises the instruction fetch, issue logic and ALUs shown in FIG. 1.

As already described with reference to FIG. 1, the thread finished counter 160 stores a record for each program scheduled, and the number of threads scheduled for the current phase. As each thread finishes a phase the thread finished counter 160 receives an indication 220 from the end of the execution pipeline 210 and adjusts the record for the number of threads executing for that program. The count of threads T for a program is simply decremented each time a thread finishes until the thread count reaches zero. When the thread count for a program reaches zero, a new phase of that program can be scheduled.

Figure 3:
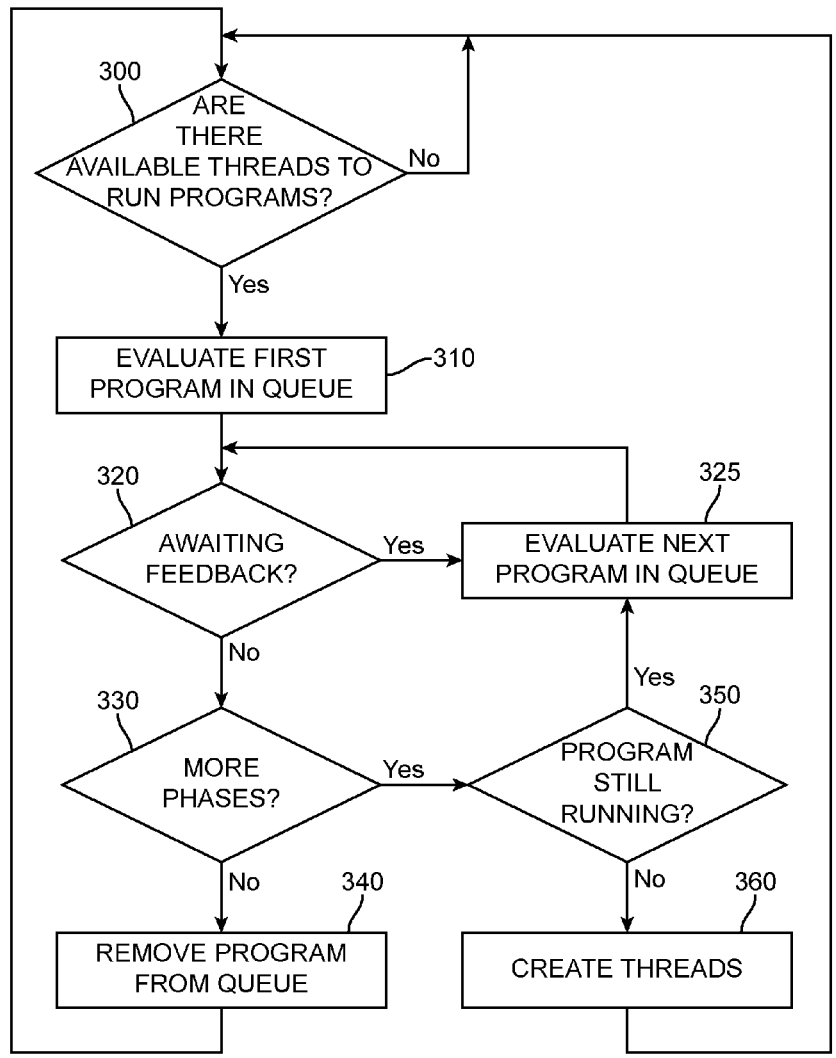
FIG. 3 is a flow diagram illustrating the steps carried out by the scheduler of FIG. 2.

FIG. 3 is a flow diagram showing the process steps carried out by the scheduler in deciding how to schedule new threads. In step 300 the scheduler first checks if there are threads available for running a program from the program queue that are available to run. If there are no threads available, the scheduler continues to check until there are threads available.

If there are threads available to run, the first program in the queue is evaluated in step 310. In step 320, the scheduler checks if the first program already has a phase running and the scheduler is waiting for feedback to indicate that the phase is completed. If so then in step 325, the next program in the queue is evaluated in the same manner. If the scheduler is not awaiting feedback from a phase of the first program, then in step 330 the scheduler assesses whether there are any further phases to execute. If there are no further phases the program is removed from the queue, as shown in step 340, and its record removed from the thread finished counter.

If there are more phases left to run, the scheduler determines whether the program is still running in step 350. If the program is still running, the scheduler moves to step 325 and next program in the queue is evaluated. If the program is not still running, the scheduler creates new threads for the next phase of the program, as indicated by step 360. Following the creation of new threads, the scheduler returns to the step 300 to check if there is room for any further threads.

Figure 4:
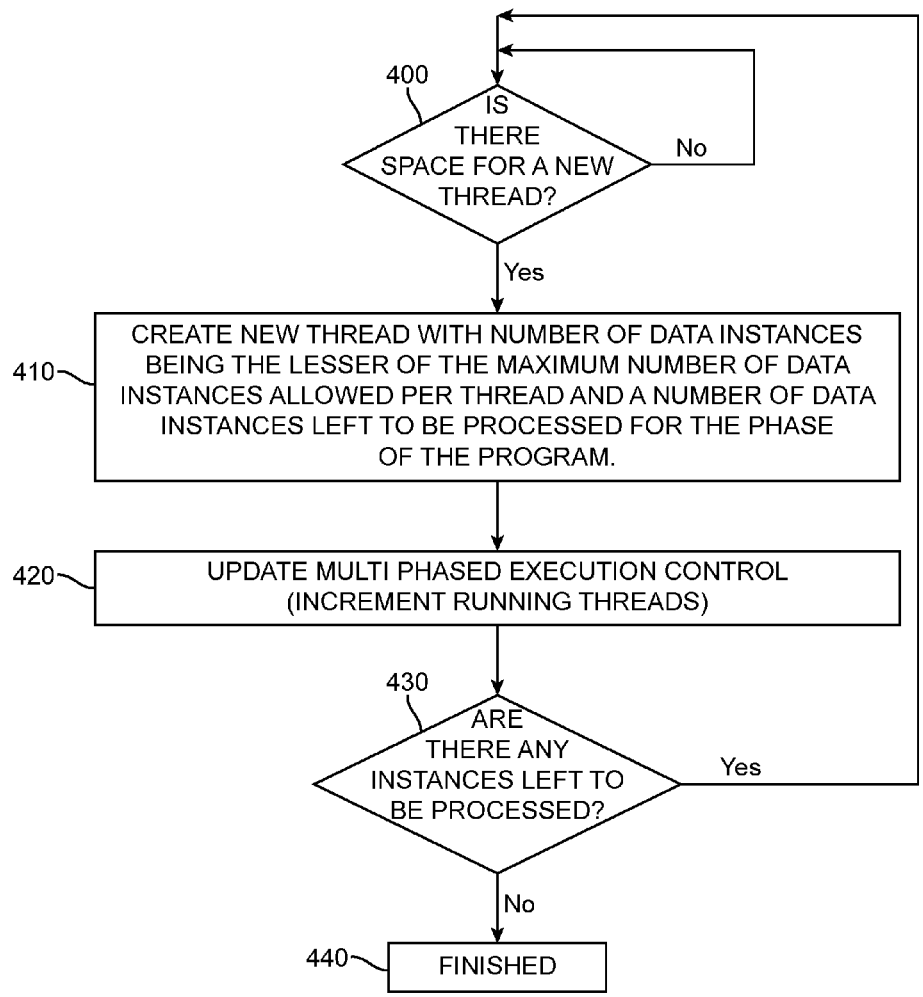
FIG. 4 is a flow diagram illustrating the process carried out by the scheduler for scheduling new threads.

FIG. 4 shows in detail the steps taken by the scheduler to create new threads in step 360. In a first step, step 400, the scheduler checks that there is space for a new thread. If not, the scheduler continues to check until space becomes available. When space for a new thread is available, the scheduler creates a new thread, shown as step 410. The number of data instances in the new thread is the lesser of the maximum number of instances allowed per thread (which is limited by the hardware) and the number of data instances left.

Once the new thread has been created, a record for the thread is created or updated in the multi phased execution control unit, and increments a count of the running threads, shown as step 420.

In step 430 the scheduler assesses whether there are further data instances to be processed in the phase. If so, the scheduler attempts to create a further thread or threads to accommodate them. If not, the thread creation process ends in step 440 and the scheduler returns to step 300.

The present invention allows the SIMD ratio of programs to be dynamically altered during program execution. By splitting programs into multiple phases and providing a scheduler that is able to determine whether execution of a phase has been completed, each phase can be separately scheduled and the results of preceding phases can be used to inform the scheduling of subsequent phases.

The invention claimed is:

1. A multithreaded single instruction multiple data (SIMD) microprocessor, comprising:
    a scheduler circuit operable for scheduling execution of phases of program instructions, from programs, wherein the phases of program instructions from each program have a predetermined relative order of execution, and a respective first phase of each program initially is to execute on a respective plurality of data instances, and each subsequent phase of each program is to process a respective subset of the respective plurality of data instances, the subset determined based on results of feedback from executing a respective preceding phase of that program, the feedback indicating which data instances are to be processed by which subsequent phase of the program, and the scheduler circuit is configured to:
    create, during scheduling of each subsequent phase of the same program, one or more threads to process data instances from the respective subset of data instances to be processed by that phase, a number of threads created for each subsequent phase being determined according to a SIMD ratio for that subsequent phase and the results of executing the respective preceding phase of the same program,
    receive an indication of execution completion of each thread, and
    maintain a count of threads remaining to be completed for the phase of a program to which a respective thread of the count of threads belongs, and responsive to the count of threads indicating that all threads for that phase are completed, allow a subsequent phase of that program to be scheduled; and
    a plurality of resources for executing the one or more threads created for scheduled phases, the plurality of resources comprising an execution pipeline configurable to process a plurality of data instances by a single thread according to the SIMD ratio for the phase of the program to which that single thread belongs and to produce the results.

2. The microprocessor according to claim 1, wherein the scheduler circuit is configured to determine a number of data instances for each of the one or more threads for each subsequent phase of program instructions, for a particular program of the programs, based on the results of executing a respective preceding phase of the that particular program.

3. The microprocessor according to claim 1, wherein the scheduler circuit is configured to maintain a record for each phase of program instructions that is scheduled, during execution of that phase of program instructions, the record maintained to track a number of threads remaining to be completed for that phase of program instructions.

4. The microprocessor according to claim 1, further including a thread finished counter, wherein, the plurality of resources are configured, responsive to each thread finishing a phase of program instructions of a particular program, to send an indication to the thread finished counter, and the thread finished counter is responsive to the indication received from the plurality of resources responsive to each thread finishing a phase of program instructions, by updating a count of threads remaining to be finished for that phase of program instructions, and wherein the scheduler circuit is configured to schedule a next phase of program instructions in the particular program only when the thread finished counter indicates that all threads for a preceding phase of the particular program have finished.

5. The microprocessor according to claim 4, wherein the thread finished counter is part of the scheduler circuit.

6. The microprocessor according to claim 4, wherein the thread finished counter comprises a memory storing a count of threads remaining to be finished for each phase of program instructions for which at least one thread is being executed and the microprocessor is configured such that the thread finished counter is decremented each time any of the at least one thread finishes, and when the thread finished counter reaches zero, the scheduler circuit is instructed to schedule a next phase of program instructions of the program to which the any of the at least one thread that finished pertained.

7. The microprocessor according to claim 4, wherein the thread finished counter stores a record of a number of data instances processed by each thread executing a respective phase of program instructions.

8. The microprocessor according to claim 1, wherein the plurality of resources for executing programming instructions comprise an Arithmetic Logic Unit (ALU) pipeline.

9. The microprocessor according to claim 1, further comprising a queue comprising program description data describing programs waiting to begin execution, the queue coupled to provide input to the scheduler circuit, wherein the program description data comprises, for a particular program, program phase data and a number defining how many data instances are to be processed by a first phase of the particular program.

10. The microprocessor according to claim 9, wherein each program in the queue is further associated with an initial number of data instances per thread, and wherein the number of data instances per thread may vary between different phases of program execution.

11. A method for scheduling program instructions in a multithreaded, single instruction multiple data (SIMD) microprocessor, the method comprising:
    creating a plurality of threads for a first phase of program instructions of a program to be executed on the microprocessor, wherein the program is split into different phases of program instructions at a branch point in the program at which different data instances may require processing through different branches of the program, the first phase to be executed on a plurality of data instances, each thread being allocated a number of data instances, and collectively, data instances allocated to the plurality of threads include all of the plurality of data instances;
    executing the plurality of threads for the first phase of the program;
    maintaining a count of threads, of the plurality of threads, that remain to be completed, in response to indications of thread completion;
    scheduling a second phase of the program after all the threads of the first phase of the program are completed, the scheduling of the second phase of the program comprising creating a plurality of threads for the second phase of the program, the plurality of threads for the second phase of the program being of a number determined based on how many data instances are to be processed by the second phase of the program and a SIMD ratio of the number of data instances processed by a single instruction during the second phase of the program.

12. The method according to claim 11, further comprising maintaining a record for each phase of the program that is scheduled, during execution of that phase of the program, the record comprising a count of threads that remain to be completed.

13. The method according to claim 12, further comprising updating the record when each thread finishes a phase of the program, and scheduling a next phase of the program only when the record indicates that all threads for a preceding phase of the program have finished.

14. The method according to claim 11, further comprising storing a record of a number of data instances allocated to each thread of a phase of the program.

15. The method according to claim 11, further comprising dynamically defining a number of threads to be created for the second phase of the program based on a result of executing the plurality of threads for the first phase of the program.

16. The method according to claim 11, further comprising assessing whether there are further data instances to be processed in a current phase of program instructions, and if so, attempting to create one or more new threads for processing the further data instances.

17. The method according to claim 11, further comprising iteratively creating threads for the second phase of the program, responsive to availability of execution resources, wherein each new thread is allocated a number of data instances determined as being a lesser of a pre-determined maximum data instances per thread and a number of data instances left to be processed for the second phase.

\* \* \* \* \*